United States Patent
Denkin et al.

(10) Patent No.: US 6,980,740 B1
(45) Date of Patent: Dec. 27, 2005

(54) APPARATUS FOR DETECTING RAMAN GAIN IN AN OPTICAL TRANSMISSION SYSTEM

(75) Inventors: Nathan M. Denkin, Matawan, NJ (US); Wenhua Lin, Middletown, NJ (US); Fatimah Shehadeh, Ocean, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1116 days.

(21) Appl. No.: 09/599,194

(22) Filed: Jun. 22, 2000

(51) Int. Cl.[7] .............................................. H04B 17/00
(52) U.S. Cl. ........................ 398/38; 398/197; 398/177; 398/181; 398/175; 398/33; 398/94
(58) Field of Search ................ 398/177, 175, 398/181, 33, 94, 97, 160, 197, 38; 359/333, 334

(56) References Cited

U.S. PATENT DOCUMENTS

| | | | | |
|---|---|---|---|---|
| 5,374,973 A | * | 12/1994 | Maxham et al. | 359/341.4 |
| 5,444,528 A | * | 8/1995 | Puschell | 356/73 |
| 5,467,218 A | * | 11/1995 | Takeda et al. | 359/341.3 |
| 5,703,711 A | * | 12/1997 | Hamada | 359/341.41 |
| 5,818,629 A | | 10/1998 | Kinoshita | 359/341 |
| 5,861,980 A | * | 1/1999 | Ono | 359/337.12 |
| 5,870,217 A | * | 2/1999 | Itou et al. | 398/97 |
| 5,909,305 A | * | 6/1999 | Kinoshita | 359/337.1 |
| 6,072,614 A | * | 6/2000 | Roberts | 398/177 |
| 6,088,152 A | * | 7/2000 | Berger et al. | 359/334 |
| 6,141,467 A | * | 10/2000 | Doerr | 385/24 |
| 6,222,962 B1 | * | 4/2001 | Nilsson et al. | 385/37 |
| 6,292,288 B1 | * | 9/2001 | Akasaka et al. | 359/334 |
| 6,359,726 B1 | * | 3/2002 | Onaka et al. | 359/337.1 |

OTHER PUBLICATIONS

F.S. Yang et al., "Nonlinear Crosstalk and Two Countermeasures in SCM–WDM Optical Communication Systems," Journal of Lightwave Technology, IEEE, New York, vol. 18, No. 4, Apr. 2000, pp. 512–520.

L. Rapp, "Impact of Stimulated Raman Scattering in WDM Systems Using Different Types of Fibres," AEU International Journal of Electronics and Communications, Gustav Fisher Verlag, JENA, DE, vol. 52, No. 5, 1998, pp. 302–309.

* cited by examiner

Primary Examiner—Leslie Pascal
Assistant Examiner—Chau M. Nguyen

(57) ABSTRACT

A unique sensor is used to detect a transmission impairment that may have affected incoming optical channel signals. The sensor, more specifically, selects a group of the incoming channel signals and generates a first power signal, $P_0$, over the selected group of signals and generates a second power signals, $P_1$, over a weighted version of the selected group of channel signals. The sensor then generates, as a function of the first and second power signals, $P_0$ and $P_1$, a signal indicative of whether the particular transmission impairment affected the levels of individual ones of the incoming channel signals. If so, then control apparatus offsets the impairment accordingly.

14 Claims, 3 Drawing Sheets

APPARATUS FOR DETECTING RAMAN GAIN IN AN OPTICAL TRANSMISSION SYSTEM

FIELD OF THE INVENTION

The invention relates to a sensor responsive to a dense band of signals transported over an optical transmission system.

BACKGROUND OF THE INVENTION

As is well known, when a number of optical channels are propagating over an optical fiber, so-called stimulated Raman scattering (gain) may cause an optical channel to interact with a channel of a longer wavelength. Such interaction causes the power in the shorter wavelength channel to decrease and power in the longer wavelength channel to increase. In effect, the power in the shorter wavelength channels is "pumped" into the longer wavelength channels. The most pronounced effects occur when the channels are separated by about 15 THz. When an appreciable number of channels are transmitted over an optical fiber with a high level of power per channel, then the effect tilts the power divergence between the channels significantly to the channels of longer wavelengths.

The effect of Raman scattering increases when more than one band of optical channels are transported over an optical fiber, e.g., C and L bands. In that instance, the effect is approximately linear with channel separation, and may be determined by summing the contribution provided by each of the channels. If the different bands of channels are produced by different sources, then the possibility arises in which an entire band of channels may be suddenly lost or present based on whether the corresponding source has suddenly failed or come on line. This problem would be manifested by a sudden change in the spectra of the other bands, which may significantly increase the error rate of those bands. Consequently, the affected bands need to be adjusted immediately, e.g., within microseconds, to changes in average signal level and tilt.

The prior art uses an optical spectrum analyzer to generate the information needed to make the above adjustments.

However, what is needed is a sensor that quickly analyzes a band of channels to quickly detect changes in power level due to Raman scattering/pumping whenever the number of channels in another band of channels changes.

SUMMARY OF THE INVENTION

We have recognized that the effect of Raman scattering may be determined very quickly by determining the ratio between the total power and a real-time weighted total power.

More specifically, a sensor processes a group of incoming channel signals to generate a first signal, $P_0$, that is indicative of the total power across the group channel signals, and a second signal, $P_1$, that is indicative of the total power across the group of channels after the group of channel signals has been subjected to a predetermined weighting function. The system then offsets, as a function of the first and second signals, any Raman scattering that may be affecting the channels signals.

GENERAL DESCRIPTION

We have recognized that, in accordance with various aspects of the invention, that the effect that an arbitrary band of channels may have on another channel due to Raman scattering may be simulated by a single channel having an effective power of $P_E$ and an effective wavelength of $\lambda_E$.

If all of the signal bands are within a particular bandwidth, e.g., within the range of 13 THz to 16 THz, then the Raman interaction between any two channels may be described approximately by the following relationship:

$$P_R = \gamma \cdot I_L I_S (\lambda_L - \lambda_S) \quad (1)$$

where $\gamma$ is the coefficient of the Raman Interaction, $I_L$ and $I_S$ (averaged over all polarizations) are the intensities of the longest and shortest wavelength channels, and $\lambda_L$ and $\lambda_S$ are the wavelengths. The effect of j channels in a single band on a single channel having a wavelength of $\lambda_L$ may be determined by summing each such effect as follows:

$$P_R = \gamma \sum_j I_L I_L (\lambda_L - \lambda_j) \quad (2)$$

Recognizing that equation (2) may be separated into two sums, then:

$$P_R = \gamma \cdot I_L \lambda_L \sum_j I_j - \gamma \cdot I_L \sum_j I_j \lambda_j \quad (3)$$

where the first sum is the total power in the band, $P_0$.

Figure 1:
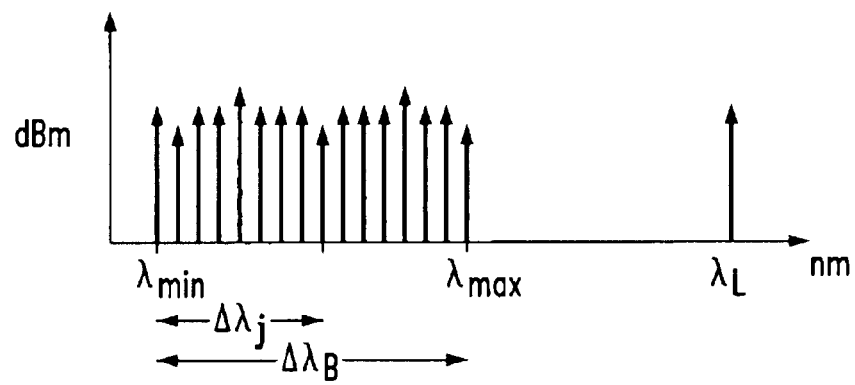
FIG. 1 illustrates signals in different bands and is useful in defining different terms discussed below.

Referring to FIG. 1 which shows signals in different bands, we define $\Delta\lambda_j = \lambda_j - \lambda_{min}$ and $\Delta\lambda_B = \lambda_{max} - \lambda_{min}$ so that equation (3) may be rewritten as follows:

$$P_R = \gamma \cdot I_L(\lambda_L - \lambda_{min})P_0 - \gamma \cdot I_L \Delta\lambda_B \sum_j \frac{I_j \Delta\lambda_j}{\Delta\lambda_B} \quad (4)$$

Note that the above summation is the sum of the powers in the band weighted linearly by the distance from the beginning of the band. Other than $P_0$, the remaining terms are constants. Therefore, equation (4) may be rewritten as follows:

$$P_R = C_0 P_0 + C_1 P_1 \quad (5)$$

where $P_1$ is the weighted sum. The full effect of Raman pumping may then be obtained by apparatus which provides $P_0$ and $P_1$ directly in real time.

DETAILED DESCRIPTION

Figure 2:
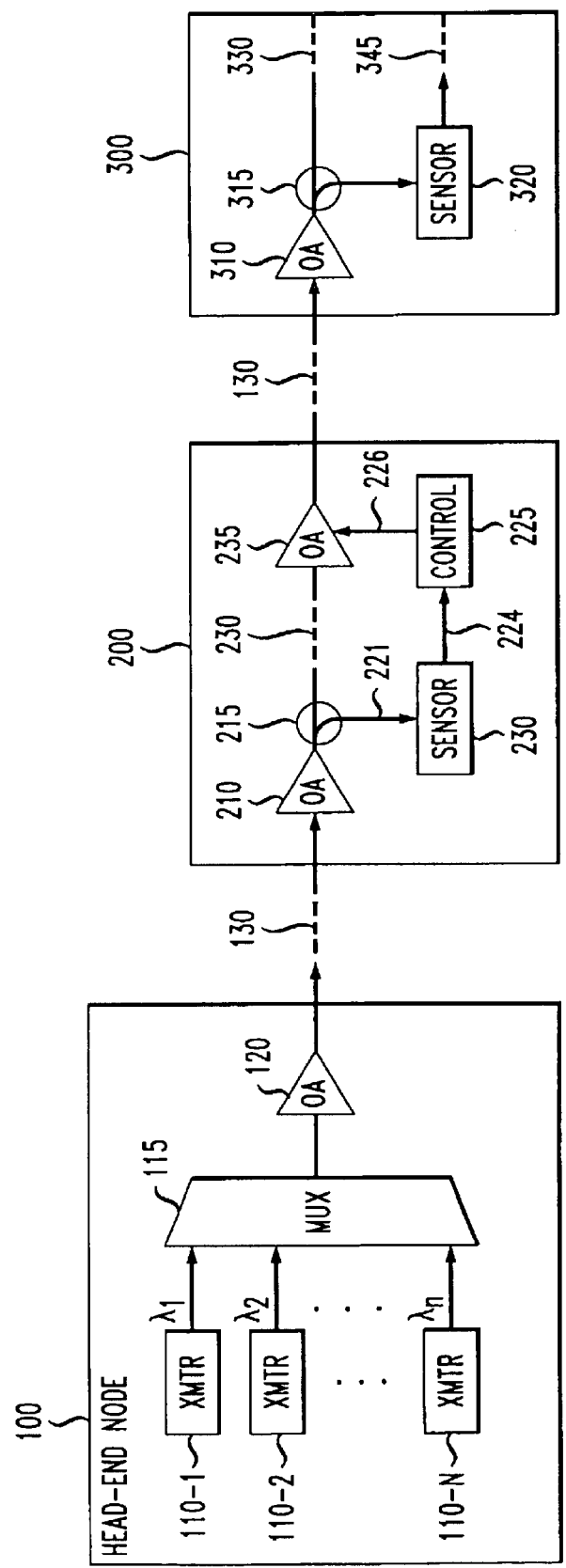
FIG. 2 illustrates in block diagram form an optical system in which the principles of the invention may be practiced.

An illustrative optical transmission system embodying the principles of the invention is shown in simplified form in FIG. 2. The optical system, more particularly, includes head-end node 100 having, inter alia, a plurality of laser transmitters (XMTR) 110-1 through 110-n, multiplexer 115 and optical amplifier 120. Each of the transmitters generates an information bearing optical signal and supplies the signal to a respective input of multiplexer 115. The optical signals, $\lambda_1$ through $\lambda_n$, so generated may constitute two different bands of optical signals/channels such that signals $\lambda_1$ and $\lambda_n$ would respectively have the longest and shortest wavelengths of the signals in the two different bands. Multiplexer 115 multiplexes the signals to an output extending to optical amplifier (OA), which amplifies and outputs the multiplexed signals to optical path segment 130 extending to a next downstream node. A number of downstream/intermediate nodes may be disposed along optical transmission path 130 as represented by the dashed portions of segments 130. Node 200 represents each such intermediate node. Thus, the following discussion of node 200 equally pertains to each of the other similarly arranged nodes.

Node 200, includes, inter alia, optical amplifier 210 that amplifies an optical signal received via path 130 and outputs the amplified signal via splitter 215 to other processing equipment, e.g., a demultiplexer, signal translation units, add/drop apparatus, etc., as represented by the dashed line 230 in node 200. Optical signal splitter 215 supplies a small portion of the amplified signal to sensor 220 and supplies the remainder of the amplified signal to the other equipment for further processing. Sensor 220 processes its portion of the amplified signal to determine if the signal had been tilted as a result of Raman scattering occurring along the transmission path 130. Sensor 220 supplies the results of its determination to control circuit 225, which then directs optical amplifier 235 to tilt the signal that it receives at its input in an opposite direction to offset the effect of the Raman scattering, if needed.

Figure 3:
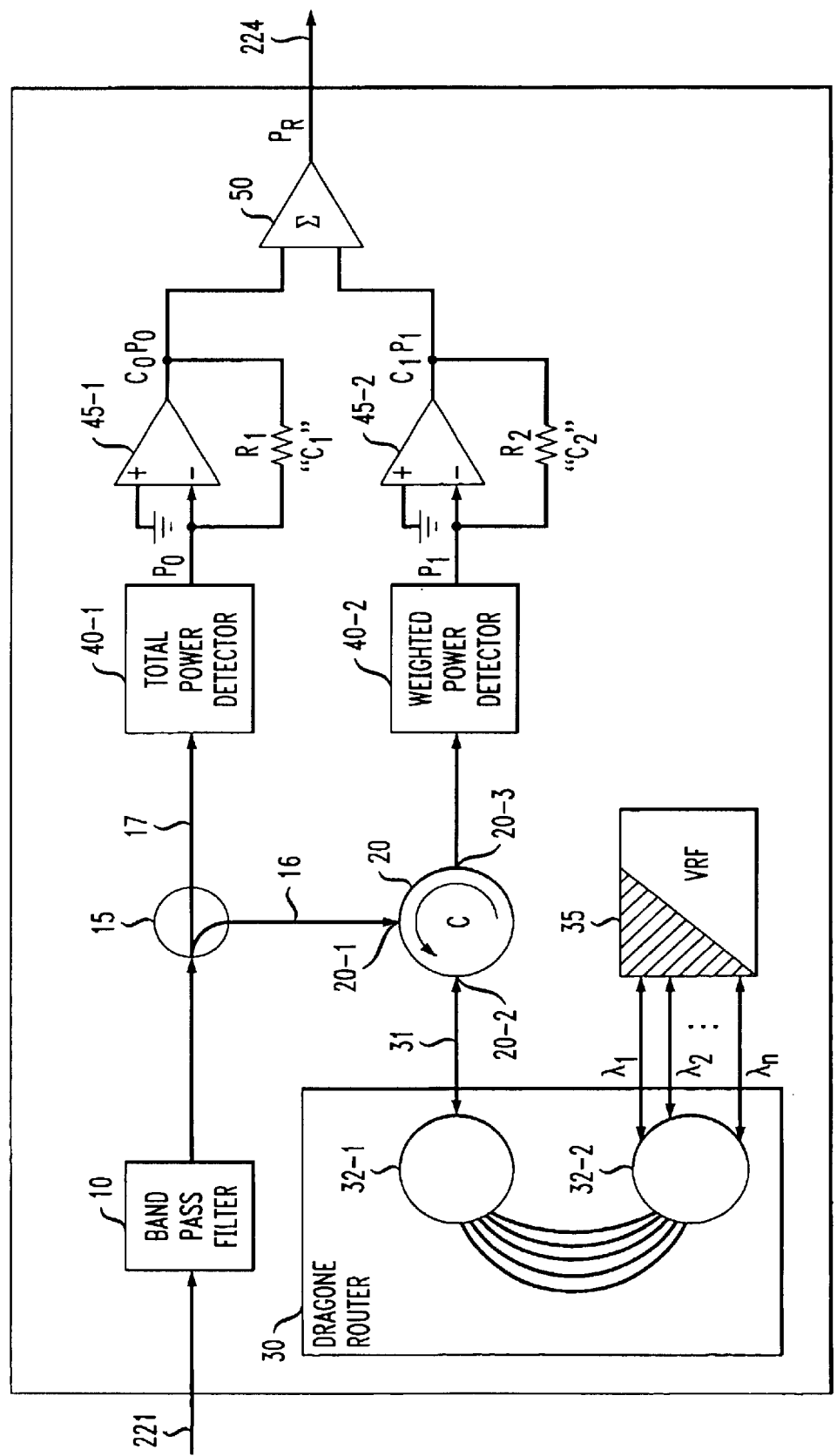
FIG. 3 is broad block diagram of the sensor of FIG. 2.

Sensor 220, shown in more detail in FIG. 3 includes, inter alia, band pass filter 10 which is tuned to one of the bands of signals received via path 221. Assuming that filter 10 is tuned to the L-band of signals, then those signals pass through filter 10, while signals of different bands/wavelengths are rejected. Splitter 15 splits the signal emerging from filter 10 into two signals, respectively supplying substantially equal portions of the split signal to total power detector 40-1 via path 17 and to port 20-1 of conventional optical signal circulator 20 via path 16. As is well-know a signal received at a circulator port is circulated in a particular direction, e.g., counterclockwise, and outputted at a next port. For example, a signal received at port 20-1 is circulated to a next port, e.g., port 20-2, and outputted at that port; a signal received at port 20-2 is similarly circulated to a next port, e.g., port 20-3, and outputted at that port, and so on. Thus, the L-band signal received at port 20-1 is circulated to and outputted at port 20-2, where it is presented via path 31 to section 32-1 of conventional Dragone router 30. Section 32-1 of Dragone router 30, in a conventional manner, demultiplexes the signal that it receives via path 31 and outputs the component signals forming the band of signals to respective output ports extending to section 32-2 of Dragone router 30. Section 32-2 of Dragone router outputs the demultiplexed signals, $\lambda_1$ through $\lambda_n$ of the filtered band of signal, to respective inputs of Variable Reflection Filter (VRF) 35. VRF 35 reflects an optical signal that it receives at one of its inputs proportional to the wavelength of the signal. Thus, the level of reflection provided by filter 35 linearly increases across a band of signal, from the longest wavelength, $\lambda_1$, to the shortest wavelength, $\lambda_n$, such that the former signal is reflected the most while the latter signal is reflected the least. For example, the reflectivity might be $R(\lambda)=(\lambda-\lambda_{min})/(\lambda_{max}-\lambda_{min})$, which ranges from 0 (for the shortest wavelength) to 1 (for the longest wavelength). In this way, the signals forming the band are linearly weighted proportional to their respective wavelengths. The reflected, weighted signals are returned to Dragone section 32-2, which then routes the weighted signals to Dragone section 32-1. The latter section then multiplexes the weighted signals onto path 31 extending to port 20-2 of circulator 20. As pointed out above, signals received at port 20-2 are circulated to and outputted at port 20-3 of circulator 20, where the multiplexed weighted signal is presented to weighted power detector 40-2. Weighted power detector 40-2, in a conventional manner, detects the level of power in the signal that it receives and outputs a signal, $P_1$, indicative thereof to amplifier 45-2. (Detector 40-2 may do this using a conventional light detector that outputs a signal having a power level proportional to the level of the light signal that it receives at its input.) Similarly, total power detector 40-1 detects the level of power in the (unweighted) signal that it receives and outputs a signal, $P_0$, indicative thereof to amplifier 45-1. Amplifier 45-1 multiples the signal $P_0$ by a constant $C_0$ (represented by the value of resistor R1) to form the sought after signal $C_0P_0$. Similarly, amplifier 45-2 multiplies the signal $P_1$ by a constant $C_1$ (represented by resistor R2) to form the other sough-after signal $C_1P_1$. Summing amplifier 50 sums the outputs of amplifiers 45-1 and 45-2 to combine signals $C_0P_0$ and $C_1P_1$ as a linear weighted sum to form above-defined signal $P_R$. The latter signal is then supplied to controller 225, which, as mentioned above, adjusts the tilt of the signal being amplified by amplifier 235 to correct for the effect of Raman scattering, if needed.

In accordance an aspect of the invention, the values of resistors R1 and R2 are calibrated for a given installation at the factory using a signal comprising all of the intended signals in the band, e.g., the L band, and then using just half of those signals. More specifically, the calibration maybe done using wavelengths of $\lambda_{max}$ and $\lambda_{min}$. For $\lambda_{max}$, $P_0$ is set to equal $P_1$, and for $\lambda_{min}$, P1 is set to 0. To determine the effective power, $P_E$, and wavelength, $\lambda_E$, $P_E=P_0$ and $\lambda_E=\lambda_{min}+\Delta\lambda_B P_1/P_0$.

Figure 4:
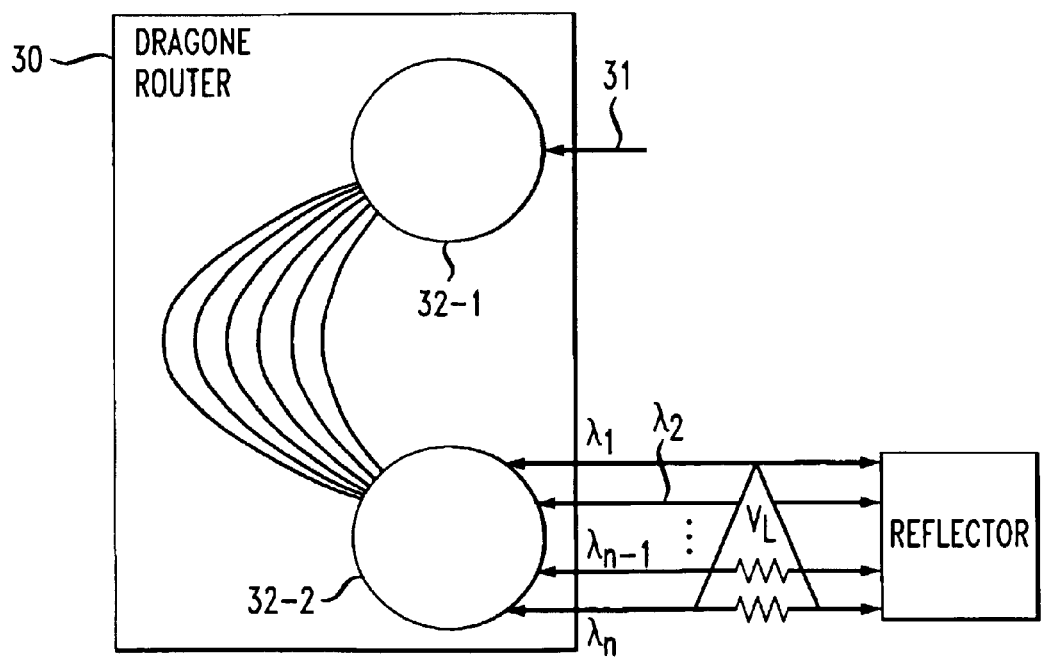
FIG. 4 illustrates an alternative way of generating weighted signals, in accordance with an aspect of the invention.

In an alternative embodiment of the invention, a variable loss device in combination with a reflector may be used in place of variable reflection filter (VRF) 35, as shown in FIG. 4. Specifically, the amount of loss inserted in each path of the demultiplexed signals is proportional to the wavelength of the signal. That is, the most loss is inserted in the path of the signal having the shortest wavelength and most loss is inserted in the path of the signal having the longest wavelength. The signals are then reflected/returned to Dragone section 32-2 by an optical reflector as shown. In this way the signals are weighted according to the amount of loss that they encounter on their way to the reflector and on their return to Dragone section 32-2.

(Note that for a Dragone router having a sufficiently large free-spectral range (FSR), the intensities in section 32-2 are uniform across all channels. Also note, that for a smaller FSR, the intensities may be approximated by a Gaussian function. As such, a Dragone router having a large FSR is preferable over a Dragone router having a smaller FSR. However, if a router of the latter type is used, then $R(\lambda)$ will need to include the Gaussian Shaping factor.

Further note, that other wavelength dependent effects may be handled using other $R(\lambda)$ functions in the reflector. For example, a polarization dependent sensor may be implemented by placing a polarization splitter between filter 10 and splitter 15 (FIG. 3) and duplicating the circuitry that follows splitter 15 so that sensor values may be obtained for each polarization.)

It will thus be appreciated that, although the invention illustrated herein is described in the context of a specific illustrative embodiment, those skilled in the art will be able to devise numerous alternative arrangements which, although, not explicitly shown or described herein, nevertheless, embody the principles of the invention and are within its spirit and scope. For example, the inventive sensor may be used to deal with transmission impairments other than Raman scattering.

We claim:

1. A transmission node comprising apparatus that receives at an input via a transmission path an optical signal formed from a plurality of optical signals of respective wavelengths, in which the levels of individual ones of the optical signals may have been affected by Raman scattering occurring along the transmission path, sensor apparatus operative for generating a first signal, $P_0$, indicative of the total power across a group of the received optical signals, and a second signal, $P_1$, indicative of the total power across the group of optical signals after those signals have been subjected to a predetermined weighting function, and controller apparatus for offsetting the effect of such Raman scattering as a function of the sum of the levels of the first and second signals.

2. The optical node of claim 1 wherein the sensor apparatus includes:

multiplier apparatus operative for multiplying the signal $P_0$ by a first constant, $C_0$, and for multiplying the signal $P_1$ by a second constant $C_1$, and combiner apparatus for combining the product $P_0C_0$ with the product $P_1C_1$ to form a signal, $P_R$, indicative of the degree to which the group of signals were affected by Raman scattering.

3. The optical node of claim 1 wherein the plurality of optical signals includes different bands of optical signals and wherein the node further comprises a bandpass filter to filter one of the bands of optical signals to form the group of signals.

4. The node of claim 3 wherein the sensor includes a total power detector and apparatus for supplying a first portion of the power of the group of signals to the total power detector and for supplying a second portion of the power of the group of signals to the predetermined weighting function which generates a weighted version of the group of signals.

5. The optical node of claim 4 wherein the predetermined weighting function includes a router which demultiplexes the group of signals, supplies the demultiplexed signals to weighting apparatus to reduce the level of power of individual ones of the demultiplexed signals proportional to their respective wavelengths, and then routes the weighted signals to a multiplexed output for delivery to a power detector operative for detecting the power across the weighted signals and generating signal $P_1$.

6. The optical node of claim 5 wherein the weighting apparatus is a variable reflection device.

7. The optical node of claim 5 wherein the weighting apparatus is a variable loss device.

8. A sensor comprising apparatus for receiving a plurality of optical signals and filtering the plurality of signals to form a group of signals, first apparatus for processing a first portion of the power levels of the group of signals to generate a first power signal, $P_0$, second apparatus for processing a second portion of the power levels of the group of signals to form a group of weighted signals, and processing the group of weighted signals to generate a second weighted power signal, $P_1$, and third apparatus for generating, as a function of the first and second power signals, $P_0$ and $P_1$, a signal indicative of whether a particular transmission impairment, occurring along a transmission path of the optical signals, has affected the levels of individual ones of the received plurality of optical signals.

9. The sensor of claim 8 wherein the transmission impairment is Raman scattering.

10. The sensor of claim 8 wherein the sensor apparatus further comprises:

multiplier apparatus operative for multiplying the signal $P_0$ by a first constant, $C_0$, and for multiplying the signal $P_1$ by a second constant $C_1$, and combiner apparatus for combining the product $P_0C_0$ with the product $P_1C_1$ to form a signal, $P_R$, indicative of the degree to which the plurality of optical signals were affected by the transmission impairment.

11. The sensor of claim 8 wherein the plurality of optical signals includes different bands of optical signals and wherein the apparatus for filtering is a bandpass filter.

12. The sensor of claim 11 wherein the second apparatus includes a router to demultiplex the group of signals, supply the demultiplexed signals to weighting apparatus to reduce the level of power of individual ones of the demultiplexed signals proportional to their respective wavelengths, and then route the weighted signals to a multiplexed output for delivery to a power detector operative for detecting the power across the weighted signals and generating signal $P_1$.

13. The optical node of claim 12 wherein the weighting apparatus is a variable reflection device.

14. The optical node of claim 12 wherein the weighting apparatus is a variable loss device.

* * * * *